United States Patent [19]
Franklin et al.

[11] Patent Number: 5,603,345
[45] Date of Patent: Feb. 18, 1997

[54] RETROFFITABLE SAFETY SHUT-OFF VALVE FOR GAS OR LIQUID METER

[75] Inventors: Richard Franklin, Manhattan Beach; Robert Salazar, Rowland Heights; William Osburn, La Canada, all of Calif.

[73] Assignee: Pacific Enterprises, Los Angeles, Calif.

[21] Appl. No.: 566,548

[22] Filed: Dec. 4, 1995

[51] Int. Cl.⁶ .................................................. F16K 17/36
[52] U.S. Cl. ............................... 137/15; 73/273; 137/38; 137/454.2; 137/551
[58] Field of Search ..................... 73/272 R, 273; 137/15, 38, 39, 454.2, 551

[56] References Cited

U.S. PATENT DOCUMENTS

| | | | |
|---|---|---|---|
| 1,777,806 | 10/1930 | Nichols | 73/273 |
| 2,585,316 | 2/1952 | Hobson . | |
| 2,703,582 | 3/1955 | Stepanian | 137/38 |
| 2,927,592 | 3/1960 | Ferre, Sr. | 137/38 |
| 3,747,616 | 7/1973 | Lloyd | 137/38 |
| 3,768,497 | 10/1973 | Mueller | 137/38 |
| 4,091,831 | 5/1978 | Pazmany | 137/38 |
| 4,212,313 | 7/1980 | Winters | 137/39 |
| 4,331,171 | 5/1982 | Novi | 137/45 |
| 4,382,449 | 5/1983 | Nelson | 137/38 |
| 4,485,832 | 12/1984 | Plemmons et al. | 137/38 |
| 4,565,208 | 1/1986 | Ritchie et al. | 137/38 |
| 4,603,591 | 8/1986 | Sibley et al. | 74/2 |
| 4,640,303 | 2/1987 | Greenberg | 137/38 |
| 4,715,394 | 12/1987 | O'Connell et al. | 137/38 |
| 4,799,505 | 1/1989 | Nowell | 137/38 |
| 4,844,113 | 7/1989 | Jones | 137/39 |
| 4,903,720 | 2/1990 | McGill | 137/38 |
| 5,029,601 | 7/1991 | Reschke et al. | 137/38 |
| 5,052,424 | 10/1991 | Zerndt et al. | 137/1 |
| 5,052,429 | 10/1991 | Yoo | 137/38 |
| 5,209,252 | 5/1993 | Perle | 137/38 |
| 5,409,031 | 4/1995 | McGill et al. | 137/38 |
| 5,449,015 | 9/1995 | Petkovic | 137/38 |

FOREIGN PATENT DOCUMENTS

| | | | |
|---|---|---|---|
| 3-255319 | 11/1991 | Japan | 73/273 |

*Primary Examiner*—Gerald A. Michalsky
*Attorney, Agent, or Firm*—Lyon & Lyon

[57] ABSTRACT

A safety valve for use in a meter through which gas or liquid may flow, the safety valve being activated to a closed position upon the disturbance of the system such as during an earthquake, thereby blocking the flow of liquid or gas. The valve may then be reopened by a reset assembly.

8 Claims, 3 Drawing Sheets

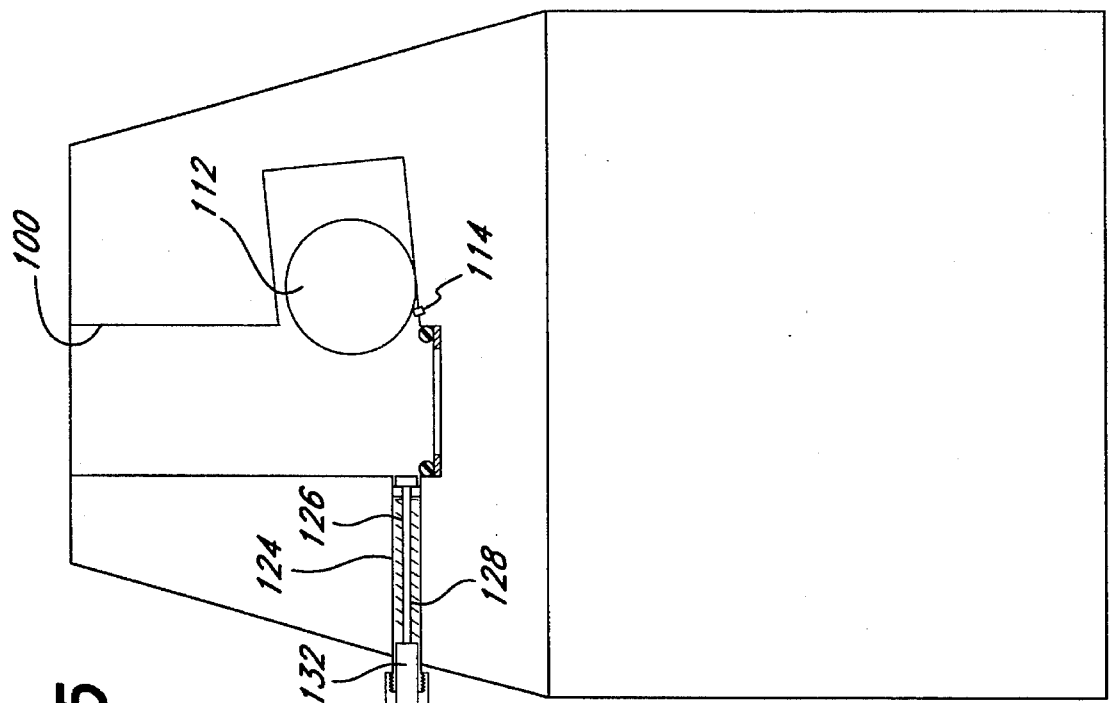
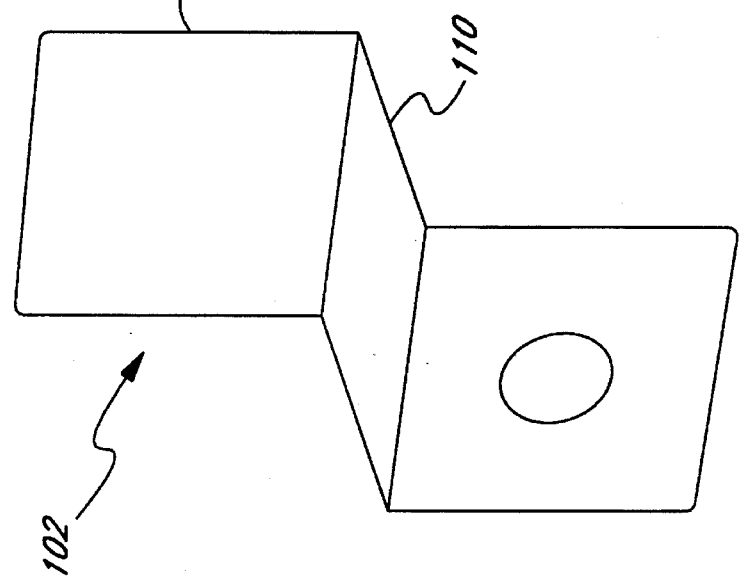

RETROFFITABLE SAFETY SHUT-OFF VALVE FOR GAS OR LIQUID METER

1. FIELD OF THE INVENTION

The current invention relates generally to safety valves, and more particularly to a safety valve that may be used to stop the flow of gas or liquid through a meter or system in the event of a seismic or other disturbance.

2. BACKGROUND OF THE INVENTION

Many commercial and residential buildings are equipped with systems to receive natural or liquid petroleum gas to power various functions in the building such as heat or other appliances. These systems typically comprise an inlet gas line which provides gas from some remote source, a gas meter which may be coupled to the inlet gas line and which records how much gas is used in the building, and an outlet gas line which extends from the meter and into the building to feed other gas lines for various locations in the building. Such systems are also typically used to deliver other gases or liquids such as water to the building, as well as to record the amount of such gas or liquid used.

Should the system which delivers gas or liquid to the building be disrupted, leaks could occur which may lead to explosion, fire, flooding or other potentially disastrous situations. Such a disruption could result from earthquakes which are quite common in California and other earthquake-prone locations, or from an accident where a vehicle crashes into the building or the gas or liquid delivery system itself. To protect against potential leaks that could arise from such disruption, safety valves have been proposed which serve to seal off or close a gas line upon the occurrence of a disruption.

However, certain existing safety valves have one or more shortcomings which may limit their usefulness. For example, certain existing valves require various attachment means to integrate the valves into the existing gas or liquid delivery system. This generally increases the complexity and cost of providing a safety valve feature in the first place and reduces the ability for the valve to be retrofitted into existing systems. As another example, other existing valves require various internal components, such as electronic or pressure differential sensors, that may again increase the cost and complexity of the valve and reduce its reliability.

Furthermore, other existing safety valves are designed to be mounted externally to the gas meter such as on or in the gas lines extending to or from the meter. Where valves are placed external to the meter, permits or other approval from local governing or other regulatory agencies are typically required which itself is a time-consuming, expensive process. Also, such external placement may lead to inadvertent closing of the valve such as that which might occur if a child playing near the gas line bumps it. And because such safety valves would not typically be suitable to be retrofitted into the gas meter itself, this could well lead to the scrapping of gas meters, an environmentally undesirable result.

Accordingly, there is a need for a safety valve that is of simple design to increase its reliability and lower its cost thereby providing an incentive for using the valve in the first place. There is also a need for a safety valve which may be retrofitted into existing gas or liquid meters to reduce the risk of inadvertent use and maximize reliability.

3. SUMMARY OF THE INVENTION

In a first aspect of the invention, a safety valve which may block the flow of a liquid or gas upon the occurrence of a seismic or other disturbance is disclosed.

In another aspect of the invention, a safety valve which may be retrofitted into existing gas meters or other gas or liquid delivery systems is described.

In another aspect of the invention, a safety valve which uses the pressure of incoming gas or liquid to maintain the valve in a closed position is described.

In another aspect of the invention, a safety valve which may be mounted internally within a gas or liquid meter is described.

4. BRIEF DESCRIPTION OF THE FIGURES

FIG. 3 shows a front view of a safety valve.

FIG. 5 shows a side section view of a meter including a valve.

5. DESCRIPTION OF THE PREFERRED EMBODIMENTS

Figure 1:
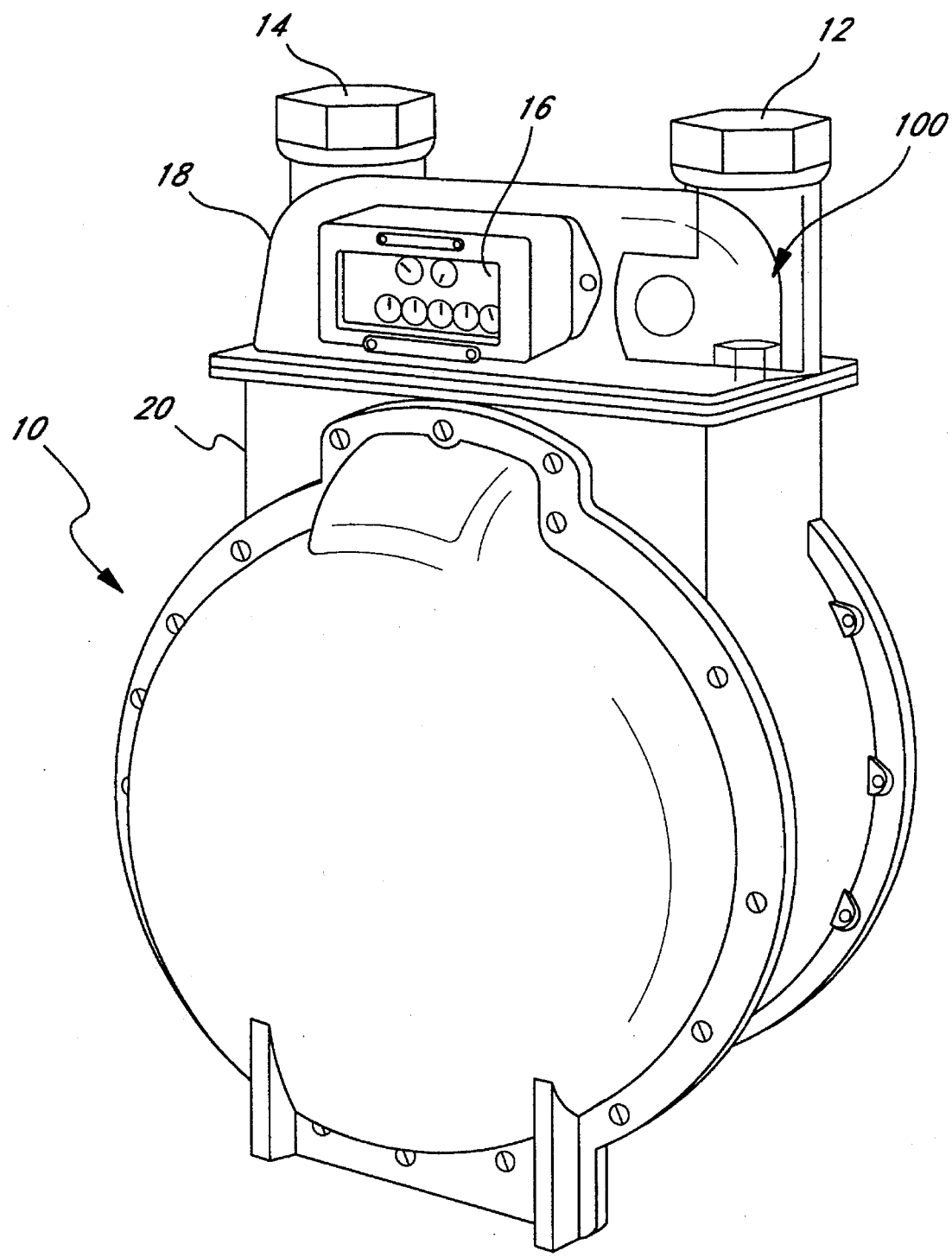
FIG. 1 is a perspective view of a gas meter partially cut away to show the safety valve therein.

FIG. 1 shows a typical gas meter 10 which includes safety valve 100. Valve 100 essentially operates such that if meter 10 is shaken as might happen during an earthquake or some other extreme vibration or displacement, valve 100 closes and blocks the flow of gas. This avoids the continued flow of gas to possible leaks downstream from the meter thereby reducing the risk of explosion or fire. This also avoids the waste of gas. As discussed later, valve 100 may also be reset to an open position to restore the flow of gas when it is safe or otherwise desired to do so.

While a gas meter is shown in FIG. 1 and reference is made throughout this disclosure to gas, the safety valve of the current invention may be used in connection with other types of gas or liquid meters, including but not limited to Sprague, American and Rockwell gas meters, as well as with water meters. It is thus not intended for the current invention to be limited to gas meters. In any event, meter 10 may include inlet line 12 which may supply gas to meter 10 from a remote source, and outlet line 14 which provides gas to the building. Meter 10 may also include components (not shown) between inlet and outlet lines 12, 14 which serve to measure the amount of gas used for display on gauge 16.

Preferably, valve 100 is mounted internally within meter 10 which may provide several benefits. First, it may not be necessary to secure permits or approval from local government or regulatory agencies when adding valve 100 within an existing meter 100. This is in contrast to the situation where approval similar to a plumbing or other permit may be necessary where a safety valve is mounted external to the meter such as on an incoming gas line. Thus instead of being absorbed in time-consuming and bureaucratic permit or approval processes, valve 100 may actually be installed into meters to increase public safety. This is especially true where local government requires that some type of safety valve be used.

Second, mounting valve 100 internally within meter 10 may reduce the risk of inadvertent activation of valve 100 and consequent blockage of gas flow. That is, because gas lines are typically long and thin, a gas line as well as a valve mounted thereon may be more easily disturbed as opposed to a meter which typically comprises heavy cast materials and is securely mounted to a building or the ground. Thus with internal mounting, disturbances caused by children or animals bumping into a gas line for example, will not inadvertently activate valve 100. Though straps or other devices may be used to secure such a line, this again increases complexity and cost. Internally mounting valve 100 within meter 10 also decreases the risk of valve tampering which risk might otherwise exist if valve 100 were mounted external to meter 10.

Third, where valve 100 is to be mounted internally within meter 10, it may be installed without temporarily turning off or otherwise disturbing the gas delivery system. This is because a bypass may be temporarily fitted to the system to direct gas flow around meter 10 while valve 100 is being installed.

Fourth, when valve 100 is mounted internally, meter 10 may serve as a protective housing for the valve instead of an additional housing having to be added to valve 100 itself. This reduces cost and complexity.

Many existing meters such as meter 10 include a top portion 18 that may be removed from the remainder of meter housing 20 to expose an end of incoming gas line 12. Accordingly for retrofitting purposes, it is preferred that valve 100 may be simply mounted internally of meter 10 by removing top portion 18 and fitting valve 100 into inlet line 12. In certain applications, a spacer means may be used in order to raise top portion 18 in order to accommodate the retrofit mechanism as described below.

Figure 2:
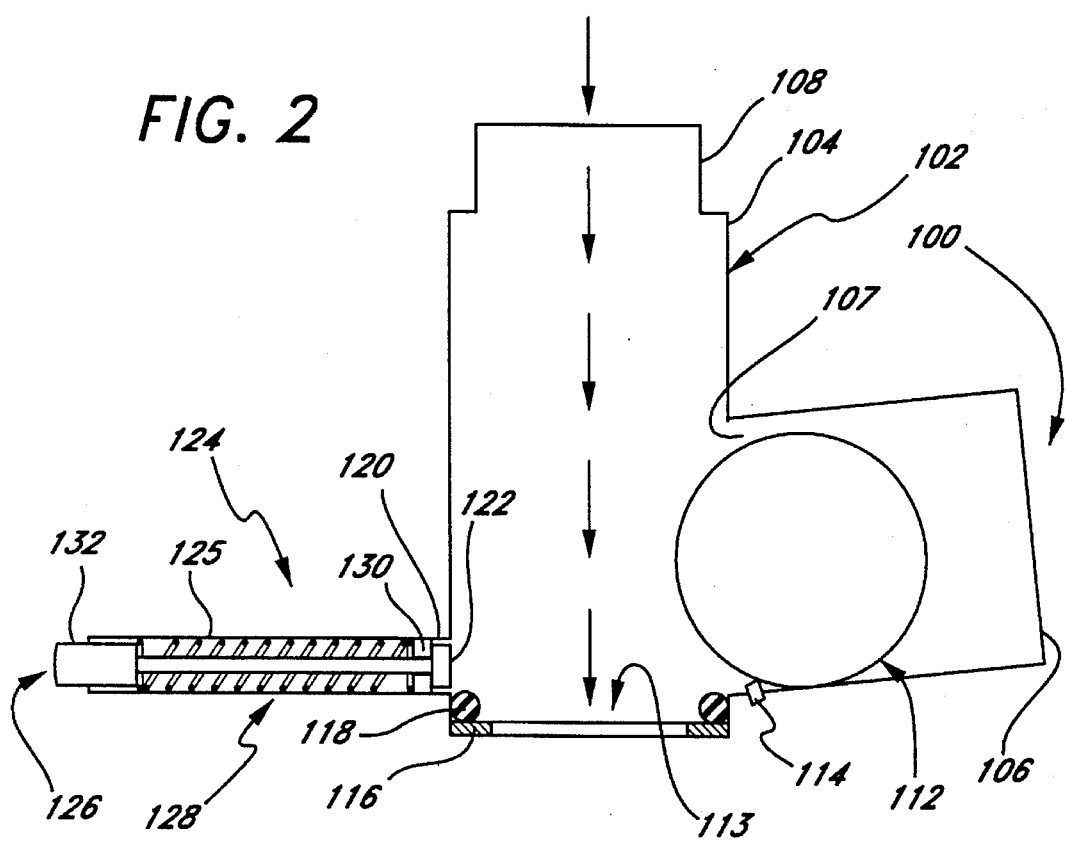
FIG. 2 shows a side section view of a safety valve in an open position.

Referring now to FIG. 2, valve 100 is described in more detail. As shown, valve 100 may include housing 102 which in turn may generally comprise gas flow portion 104 and storage portion 106. Storage portion 106 preferably merges with gas flow portion 104 through opening 107 which may comprise a hole in the wall of storage portion 106. Gas flow portion 104 is preferably configured so that it acts as an extension of inlet line 12. Thus when valve 100 is in an open position as shown in FIG. 2, gas flows from inlet line 12, through gas flow portion 104 and into the interior of meter 10. Gas flow and storage portions 104, 106 may be cylindrical but alternative shapes may be used to accommodate retrofitting in existing meters 10.

It is preferred that the top end of gas flow portion 104 be adapted to be press or snap fit into inlet gas line 12 to reduce the number of components necessary to install valve 100 into meter 10. This facilitates the retrofitting of existing meters by reducing complexity and cost. To this end, it should be noted that many existing earthquake valves require cutting, threading and other operations which increase the complexity of installation. Alternatively, other methods of attaching valve 100 within meter 10 may be used.

The top end of gas flow portion 104 may include annular shoulder 108, the outer diameter of which is substantially equivalent to the inside diameter of inlet line 12. Thus to fit valve 100 into meter 10, top portion 18 may be removed and annular shoulder 108 may be press fit into inlet line 12. Alternatively, the top end of inlet line 12 may assume various configurations to accommodate varying inlet line 12 configurations. It is also preferred that valve 100 be mounted to inlet line 12 so that when valve 100 is activated and thus in a closed position, the pressure from the incoming gas maintains valve 100 in this closed position.

Housing 102 may comprise any material suitable for use with the type of gas or liquid that is intended to flow therethrough. Example materials include cast aluminum, iron, steel or plastics that would not react with the gas or liquid. Housing 104 may comprise a single cast piece or several pieces or segments welded or otherwise attached together. For example, gas flow portion 104 and storage portion 106 may comprise separate tubes or pipe sections that are welded together.

A segmented configuration of housing 102 may be preferred in order for valve 100 to fit within an existing meter 10 thereby allowing retrofitting. To also facilitate retrofitting, housing 102 may include an offset such as offset 110 shown in FIG. 3. Other offsets at different locations in gas flow portion 104 and/or storage portion 106 may also be used. Furthermore, the axis of storage portion 106 may be oriented at different vertical or lateral angles relative to gas flow portion 104 so that valve 100 fits within the desired meter. Still further, gas flow and storage portions 104, 106 may include indentations, curves or other geometrical shapes, irregularities or configurations to allow retrofitting by providing that valve 100 fits into the space provided within various types of meters. Gas flow and storage portions 104, 106 may also vary in size to accommodate larger or smaller lines and meters as well as the higher or lower pressure of the gas or liquid flowing therethrough.

The operation of valve 100 is now further discussed with reference to FIG. 2. When valve 100 is in an open position as shown, trip ball 112 may be held in place within storage portion 106 by detent means 114. In one embodiment, the detent means 114 is a pin. In another embodiment a depression or well is provided as the detent means 114 within which the trip ball 112 would normally reside such that vibration or displacement would dislodge trip ball 112 from the detent means 114. During an earthquake or other extreme vibration or displacement or displacement, meter 10 along with safety valve 100 is shaken such that trip ball 112 rolls over detent means 114, down storage portion 106 and into gas flow portion 104 where trip ball 112 is generally received by receptacle 113.

Figure 4:
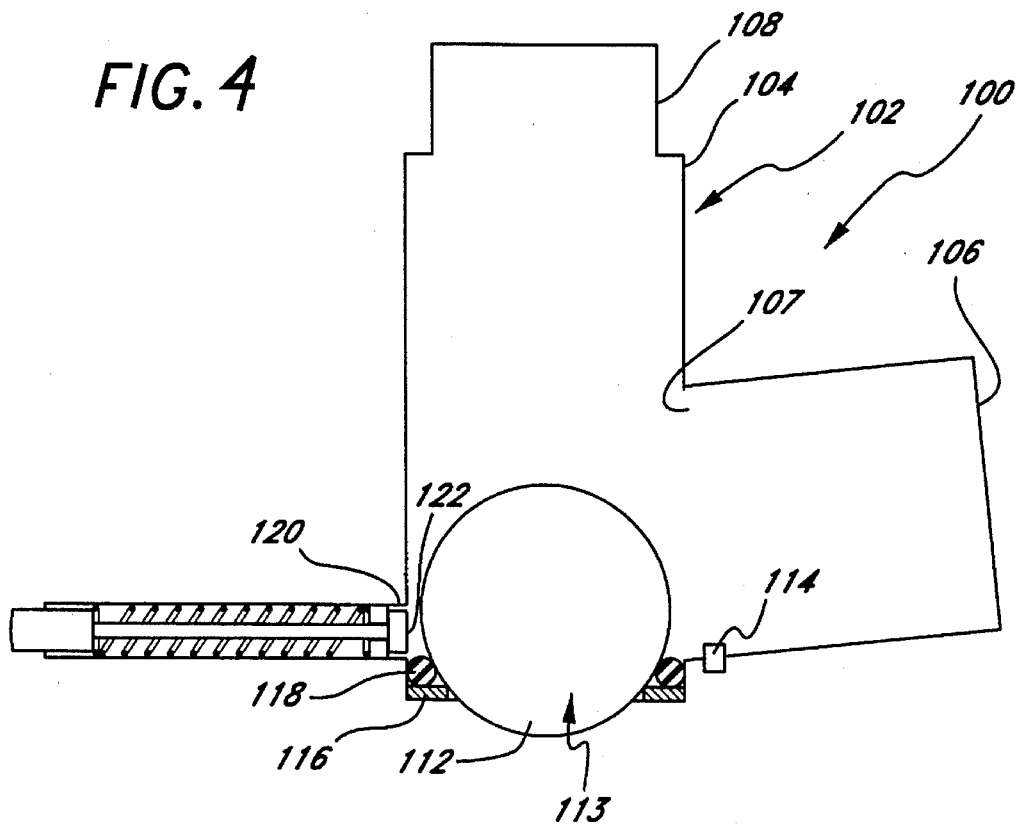
FIG. 4 shows a side section view of a safety valve in a closed position.

When located at receptacle 113, trip ball 112 effectively blocks the flow of gas through meter 10 and therefore prevents gas from reaching leaks that may exist downstream. To facilitate the closing of valve 100 in the event of a sufficient seismic or other vibration or displacement force, the axis of storage portion 106 is positioned at a downward angle so that trip ball 112 readily moves towards the gas flow portion 104 due to gravity and into a closed position as shown in FIG. 4. The downward angle of storage portion 104 is preferred because trip ball 112 will automatically roll downward and into flow portion 104 regardless of the direction from which the vibration or displacements or displacement associated with an earthquake originate.

Receptacle 113 may comprise different components. For example, when in a closed position, trip ball 112 may rest on inward flange 116 which may be included at or near the bottom of gas flow portion 104. Flange 116 may be beveled so that it essentially corresponds with the curvature of trip ball 112. Also, trip ball 112 is preferably sized so that it seals the gas line to prevent or at least significantly reduce further gas flow. To this end, suitable gaskets or O-ring 118 may be located on or near flange 116 to provide a secure fit between trip ball 112 and gas flow portion 104. O-ring 118 preferably comprises a material that will not react with the gas or liquid intended to flow through valve 100. And as noted above, because trip ball 112 blocks the incoming gas line in meter 10, the pressure of the incoming gas in inlet line 12 and gas flow portion 104 maintains trip ball 110 securely in place.

Trip ball 112 is preferably sized in relation to receptacle 113 so that when in a closed position, trip ball 112 sufficiently extends below flange 116, or other device used to seat trip ball 112, so that trip ball will not easily become unseated. Thus, for example, if meter 10 ends up in an angled position after an earthquake, trip ball 112 still remains seated. To this end it is preferred that trip ball remain seated even where meter 10 and/or the axis of gas flow portion 104 are angled at up to about 45 degrees from vertical.

Preferably, valve 100 may be adjusted so that only vibration or displacements or displacement above a certain threshold level will activate trip ball 110. Thus in the case of an earthquake, valve 100 may be set so that only earthquakes of some minimum force and acceleration will activate valve 100, e.g., 5.2 on the Richter scale. Adjustment may occur through several factors as described below.

Detent means 114 may be adjusted so that it protrudes into storage portion 106 by varying heights. As can be appreciated from FIG. 2, as the height of detent means 114 is increased or the depth of a detent means well 114 is increased, more vibration or displacement will generally be required for trip ball 112 to roll thereover. In this manner, detent means 114 may also be set so that while an earthquake of sufficient magnitude will trigger valve 100, an inadvertent bump from a child playing near the meter, for example, would not. To provide such adjustment, detent means 114 may comprise a set screw that threadably engages a hole in storage portion 106. The top of detent means 114 may be flat as shown, or may be rounded, beveled or assume some other shape. The configuration of the top of a detent means 114 may thus be chosen to increase or decrease the resistance to trip ball 112 rolling thereover. Also, storage portion 106 may include a bowl section on its floor so that the ball must overcome an upwardly sloping section.

The angle of storage portion 106 may also be adjusted. Generally, as the angle between the axis of storage portion 106 and horizontal increases, less vibration or displacement would be necessary to unseat trip ball 112. And as mentioned above, the angle of storage portion 106 may be adjusted so that valve 100 may be retrofitted into existing meters 10.

Trip ball 112 may also be adjusted to respond to varying amounts of vibration or displacement. Generally, the weight of trip ball 112 may be increased to increase the amount of force required to unseat it from and over detent means 114. It should be noted that trip ball 112 should be heavy enough so that it may remain seated in gas flow portion 104 after valve 100 has been closed. Trip ball 112 may comprise any suitable material including steel, or any other material that preferably does not react with the gas or liquid that is intended to flow through valve 100.

The reopening of valve 100 is now further described. Housing 102 may include reset portion 120 as shown in FIGS. 2 and 4. Reset portion 120 may be contiguous with housing 102 or may be welded or otherwise attached thereto. Reset portion 120 is preferably aligned with an opening 122 in gas flow portion 104. Reset assembly 124 may be attached to reset portion 120 or may alternatively be attached directly to housing 102 to communicate with opening 122.

As shown, reset assembly 124 may include barrel 125, plunger 126, spring 128 and plunger stop 130. Plunger 126 may include plunger handle 132 which may be positioned so that it is accessible from the exterior of meter 10. It is preferred that plunger 126 normally be in a retracted position so that it does not interfere with the flow of gas through valve 100. To this end, spring 128 is positioned within barrel 125 so that it is somewhat compressed when its ends abut plunger stop 130 and plunger handle 132. Plunger 126 is thus held against plunger stop 130 and preferably out of gas flow portion 104.

To reopen valve 100, plunger 126 is advanced so that it contacts trip ball 112 and pushes trip ball 112 far enough into storage portion 106 so that it rolls over detent means 114 and comes to rest. To this end, it is preferred that spring 128 may be compressed enough so that plunger 126 may be advanced a sufficient distance. Also, plunger 126 may be advanced manually or by some electro-mechanical or other device (not shown).

As shown in FIG. 5, reset assembly 124 is preferably accessible externally to meter 10. That is, plunger handle 132 may protrude from meter 10 so that an individual need only press plunger handle 132 to remove trip ball 112 from gas flow portion 104. For safety reasons, it is preferred that cover 134 be fitted to meter 10 over plunger handle 132. As shown in FIG. 5, barrel 125 may protrude from meter 10 and may include threads which are engaged by cover 134. In this manner, an individual need only unscrew cover 134 from barrel 125 to access plunger handle 132. Plunger 126 may then be advanced by hand or other simple tool thereby opening valve 100.

Also for safety reasons, it is preferred that cover 134 and plunger handle 132 be positioned so that they are accessible from the rear of meter 10, i.e., side of the meter facing the building. This reduces the risk of plunger 126 being inadvertently pushed and trip ball 112 dislodged from gas flow portion 104 before it is desired to reopen valve 100. This might otherwise occur if plunger handle 132 were easily accessible in the front of meter 10.

It is clear from the foregoing disclosure that while particular form of the invention have been illustrated and described, various modifications may be made without departing from the spirit and scope of the invention. Accordingly, it is not intended that the invention be limited to the foregoing disclosure except as by the appended claims.

What is claimed is:

1. A valve for retrofitting within a meter, comprising:
   a flow portion in communication with a receptacle when the valve is open;
   a storage portion coupled to the flow portion via an opening, the storage portion being angled downwardly along its entire length;
   a set screw detent mounted into a floor of the storage portion and adjustably protruding from the floor to vary the amount of protrusion;
   a trip ball removably housed within the storage portion and adjacent to the detent when the valve is open, whereby the detent is positioned between the center of the trip ball and the receptacle when the valve is open;
   the receptacle coupled to the floor portion to receive the trip ball when the valve is closed; and
   a plunger which is movably coupled to the flow portion and which may be advanced to return the trip ball to the storage portion.

2. The valve of claim 1 wherein the flow portion has a top end including an annular shoulder defining an outer diameter that is smaller than the outer diameter of the flow portion.

3. The valve of claim 1 wherein the receptacle comprises a flange.

4. A seismic sensitive gas meter, comprising:
   a housing including an inlet gas line;
   a gas flow portion mounted within the gas meter and aligned with the inlet gas line;
   a storage portion coupled to the gas flow portion via an opening, the storage portion being angled downwardly along its entire length;

a detent set screw mounted into a floor of the storage portion and adjustably protruding from the floor to vary the amount of protrusion;

a trip ball removably housed within the storage portion and adjacent to the detent when the valve is open;

a receptacle coupled to the gas flow portion to receive the trip ball when the valve is closed; and a plunger which is movably coupled to the gas flow portion and which may be advanced to return the trip ball to the storage portion;

whereby the detent is positioned between the center of the trip ball and the receptacle when the valve is open.

5. The meter of claim 4, wherein the flow portion has a top end including an annular shoulder.

6. The meter of claim 4, further comprising a hole in the housing through which the plunger protrudes.

7. A method for retrofitting a valve said valve having the following features:

a flow portion in communication with a receptacle when the valve is open;

a storage portion coupled to the flow portion via an opening, the storage portion being angled downwardly along its entire length;

a set screw detent mounted into a floor of the storage portion and adjustably protruding from the floor to vary the amount of protrusion;

a trip ball removably housed within the storage portion and adjacent to the detent when the valve is open, whereby the detent is portioned between the center of the trip ball and the receptacle when the valve is open;

the receptacle coupled to the floor portion to receive the trip ball when the valve is closed; and a plunger which is movably coupled to the flow portion and which may be advanced to return the trip ball to the storage position, said method comprising:

removing a portion of an meter to expose an end of an inlet line;

press-fitting the valve into the end of an inlet line; and replacing the portion of a meter.

8. The process of claim 7 wherein the valve includes a gas flow portion having a top end, the top end being press-fit into the end of the inlet line.

* * * * *